(12) United States Patent
Wojtalik et al.

(10) Patent No.: US 11,104,369 B2
(45) Date of Patent: Aug. 31, 2021

(54) TO STEERING COLUMN ASSEMBLIES

(71) Applicant: TRW Steering Systems Poland Sp. Z.o.o., Czechowice-Dziedzice (PL)

(72) Inventors: Artur Wojtalik, Katowice (PL); Pawel Ponikiewski, Pwewl Mala (PL); Slawomir Kwasny, Czechowice-Dziedzice (PL)

(73) Assignee: ZF Automotive Systems Poland SP. Z.o.o., Czechowice-Dziedzice (PL)

( * ) Notice: Subject to any disclaimer, the term of this patent is extended or adjusted under 35 U.S.C. 154(b) by 133 days.

(21) Appl. No.: 16/488,711

(22) PCT Filed: Feb. 27, 2018

(86) PCT No.: PCT/EP2018/054779
§ 371 (c)(1),
(2) Date: Aug. 26, 2019

(87) PCT Pub. No.: WO2018/154137
PCT Pub. Date: Aug. 30, 2018

(65) Prior Publication Data
US 2021/0107555 A1  Apr. 15, 2021

(30) Foreign Application Priority Data

Feb. 27, 2017 (EP) .................................... 17461511
Mar. 31, 2017 (GB) .................................... 1705275

(51) Int. Cl.
*B62D 1/185* (2006.01)
*B62D 1/19* (2006.01)
*B62D 7/22* (2006.01)

(52) U.S. Cl.
CPC ............. *B62D 1/185* (2013.01); *B62D 1/192* (2013.01); *B62D 7/224* (2013.01)

(58) Field of Classification Search
CPC ......... B62D 1/185; B62D 7/224; B62D 1/192
See application file for complete search history.

(56) References Cited

U.S. PATENT DOCUMENTS

| | | | |
|---|---|---|---|
| 5,758,545 A * | 6/1998 | Fevre ..................... | B62D 1/185 280/775 |
| 2016/0144892 A1 | 5/2016 | Buzzard et al. | |
| 2017/0261028 A1* | 9/2017 | Wilkes .................... | F16C 29/04 |
| 2018/0215408 A1* | 8/2018 | Ponikiewski ............. | F16C 3/03 |
| 2018/0229756 A1* | 8/2018 | Appleyard .............. | F16C 3/035 |

FOREIGN PATENT DOCUMENTS

| | | |
|---|---|---|
| EP | 0836980 A2 | 4/1998 |
| FR | 2031653 A5 | 11/1970 |
| JP | H07186973 A1 | 7/1995 |
| WO | 2016083802 A1 | 6/2016 |

* cited by examiner

*Primary Examiner* — Drew J Brown
(74) *Attorney, Agent, or Firm* — Robert James Harwood

(57) ABSTRACT

A telescopic steering column assembly comprises a telescopic shroud having an inner shroud portion and an outer shroud portion, and a telescopic steering shaft that passes through the shroud, comprising an inner shaft portion and an outer shaft portion. The telescopic steering shaft is supported by the shroud through a support assembly interposed between the outer shaft portion and the inner shroud portion, which in use, limits or removes free play between the telescopic steering shaft and the shroud that would otherwise occur in at least one direction orthogonal to the telescopic movement.

19 Claims, 2 Drawing Sheets

TO STEERING COLUMN ASSEMBLIES

CROSS-REFERENCE TO RELATED APPLICATIONS

This application is a national stage of International Application No. PCT/US2018/054779, filed Feb. 27, 2018, the disclosure of which is incorporated herein by reference in its entirety, and which claimed priority to, and the benefit of, European Patent Application No. 17461511.2, filed Feb. 27, 2018, and GB Patent Application No. 1705275.4 filed Mar. 31, 2017, the full disclosures of which are incorporated herein by reference.

TECHNICAL FIELD

This invention relates to an improved steering column assembly.

BACKGROUND

There are many applications in which it is desirable for a steering column apparatus to be telescopic so that the length of the steering column can be adjusted. By allowing part of the shaft or shroud to move telescopically over another, the steering assembly can be adjusted for reach. In a crash, where a driver impacts the steering wheel, this can also allow the wheel to move and, by controlling the rate at which the telescopic movement occurs, it is possible to absorb the energy in the crash in a controlled manner.

In a typical arrangement, the steering column includes a telescopic tubular shroud having an outer shroud portion and an inner shroud portion. There is typically a slit in the top surface of the outer shroud portion, which extends along a large portion (usually more than half) of its length and which enables the outer shroud portion to be squeezed into firm contact with the inner shroud portion by means of a driver-operated clamping mechanism which is assembled around a so-called adjustment clamp bolt. The clamp bolt is typically able to slide in a generally vertical direction in slots in a vehicle mounted so-called rake bracket in order to make the steering wheel adjustable for height. The steering wheel actually adjusts in an arc centred around a pivot axis which is usually designed as part of the lower mounting means where an optional electric power steering (EPS) unit mounts to the vehicle at the lower end of the overall column and EPS assembly. The clamp bolt also passes through generally horizontal slots in the clamp brackets that form an upper part of the upper tube in order to allow the steering wheel to be adjusted for reach.

Although other arrangements are possible and are sometimes used, it is common for the outer shroud portion to form the upper portion of the shroud—that is, the portion closest to the steering wheel—and for the inner shroud portion to form the lower portion of the shroud. Furthermore, the upper portion of the shaft is typically the outer shaft portion with the inner shaft portion forming the lower portion of the shaft.

It is conventional to support the upper shaft portion by one ball bearing assembly located at the upper end of the upper shroud portion and also lower down via a splined sliding interface with the lower shaft portion that forms the input shaft of the EPS unit. The EPS input shaft is typically cantilevered from two closely spaced bearings within the gearbox of an EPS unit. The resistance to bending of the pair of shafts, i.e. the upper shaft portion and lower shaft portion, critically depends on the bending stiffness of the said sliding interface which, because it must slide freely to allow the steering column assembly to telescopically-adjust, must possess some, albeit small, clearances.

This method of supporting the upper shaft portion, while economical, makes it difficult to achieve the minimum natural vibration frequency target (typically 50 Hz) which vehicle manufacturers usual impose. Historically, this target has been aimed at minimizing steering wheel shake due to engine vibrations or road roughness. More recently, some vehicle manufacturers have been specifying still higher targets to avoid steering wheel shake during the operation of automatic engine stop-start fuel saving strategies.

SUMMARY

It is an object of the present invention to improve the performance of a steering column assembly such as the kind described above.

According to a first aspect of the invention, there is provided a telescopic steering column assembly comprising a shroud having an inner shroud portion and an outer shroud portion, an end part of the inner shroud portion being received within an end part of the outer shroud portion to permit telescopic adjustment of the steering column assembly, a telescopic steering shaft that passes through the shroud, the telescopic steering shaft comprising an inner shaft portion and an outer shaft portion, an end part of the inner shaft portion being received within an end part of the outer shaft portion, the telescopic steering shaft being supported by the shroud through a support assembly interposed between the outer shaft portion and the inner shroud portion, the support assembly, in use, limiting or removing free play between the telescopic steering shaft and the shroud that would otherwise occur in at least one direction orthogonal to the telescopic movement, characterised in that the support assembly includes a body portion that is restrained in a longitudinal direction of the telescopic steering shaft relative to one of the outer shaft portion and inner shroud portion and a plurality of resiliently-deformable legs extending away from the body portion to engage the other of the outer shaft portion and the inner shroud portion, the resiliently-deformable legs, in use, applying a biasing force between the outer shaft portion and inner shroud portion.

The support assembly therefore acts to keep the telescopic steering shaft in alignment within the shroud and to provide an additional point of support which increases the natural frequency of the steering column assembly. Furthermore, the support assembly allows low-friction motion both axially and rotationally, which is imperative to give a high-quality feel to the user.

The resiliently-deformable legs may bear on a surface of the other of the outer shaft portion and inner shroud portion.

Preferably, the resiliently-deformable legs each have a proximal end adjoining the body portion and a distal end which extends away from the body portion in a substantially longitudinal direction of the telescopic steering shaft.

The resiliently-deformable legs may form two sets, a first set of the resiliently-deformable legs extending away from the body portion in substantially the longitudinal direction of the telescopic steering shaft and a second set of the resiliently-deformable legs extending in a direction substantially opposing that of the first set.

The resiliently-deformable legs may include a curved portion. The curved portion may be shaped such that a constant surface area of the curved portion is in contact with the other of the outer shaft portion and inner shroud portion during flexion of the resiliently-deformable leg. By doing so, a constant feel can be given to the sliding of the support assembly, whether or not the telescopic steering shaft and shroud are in perfect alignment or undergoing rotation.

The provision of the curved shape may also provide a reduction in sliding resistance during column reach adjustment compared with a flattened and hence broader contact region.

Each resiliently-deformable leg may be a leaf spring. The resiliently-deformable legs may be spaced evenly around the support assembly. There may be equal numbers of resiliently-deformable legs in each set. There may be three resiliently-deformable legs in each set, four resiliently-deformable legs in each set, or a greater number than four resiliently-deformable legs in each set. Preferably, there may be nine resiliently-deformable legs in each set, and a total of eighteen resiliently-deformable legs in the support assembly.

In use, each resiliently-deformable leg may be under load. For example, the support assembly may be manufactured such that it is naturally slightly larger than the space between the inner shroud portion and outer shaft portion. Thus, when interposed between the inner shroud portion and outer shaft portion, the resiliently-deformable legs will deform and provide the biasing force. The resiliently-deformable legs may be formed integrally with the body portion.

The support assembly may be fixed such that it cannot slide in a longitudinal direction of the telescopic steering shaft by a fastening means. Said fastening means may, for example, be a circlip.

In one embodiment, the body portion may form a plain bearing, in use, with the one of the outer shaft portion and inner shroud portion.

In another embodiment, the support assembly may further comprise an inner portion, the inner portion being interposed between the body portion and the one of the outer shaft portion and inner shroud portion and forming a plain bearing with the body portion to enable low-friction rotation of the telescopic steering shaft relative to the shroud.

In a further embodiment, the support assembly may further comprise a support bearing assembly, the support bearing assembly being interposed between the body portion and the one of the outer shaft portion and inner shroud portion to enable low-friction rotation of the telescopic steering shaft relative to the shroud.

Preferably, the one of the outer shaft portion and inner shroud portion may be the outer shaft portion and the other of the outer shaft portion and inner shroud portion may be the inner shroud portion.

The support assembly may form an annulus around the telescopic steering shaft.

BRIEF DESCRIPTION OF DRAWINGS

There will now be described, by way of example only, two embodiments of the present invention with reference to the accompanying drawings, in which.

DETAILED DESCRIPTION

Figure 1:
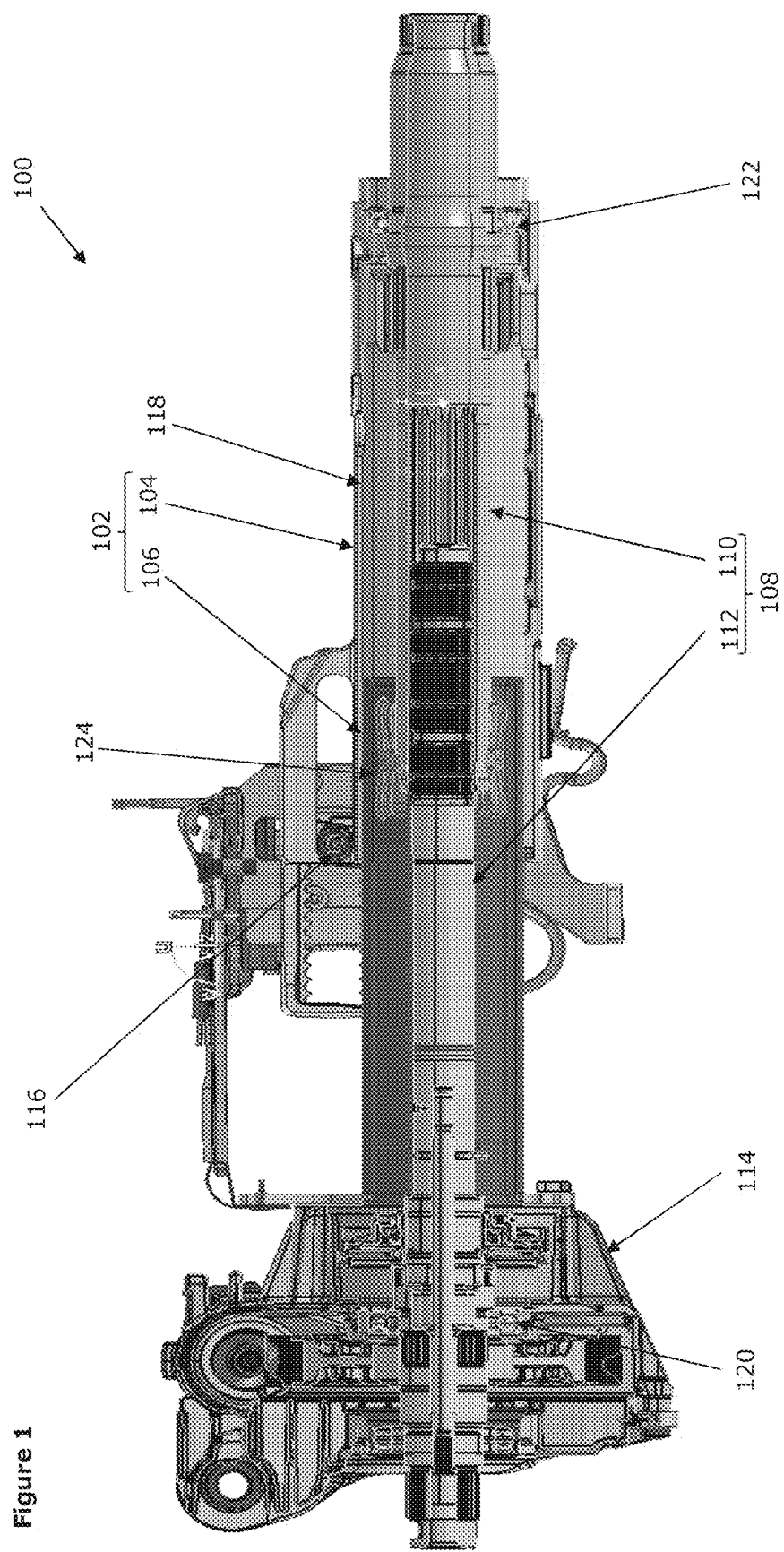
FIG. 1 is a vertical cross-sectional view of an embodiment of a steering column assembly in accordance with the present invention.

FIG. 1 provides a view of a telescopic steering column assembly 100 in accordance with a first embodiment of the present invention. The steering column assembly 100 comprises a shroud 102 including an outer shroud portion 104 and an inner shroud portion 106, each of which comprises a substantially cylindrical tube. The shroud portions 104, 106 are movable relative to one another with the end of the inner shroud portion 106 being a sliding fit within an end of the outer shroud portion 104. In the present embodiment, the outer shroud portion 104 is positioned closest to the end of the steering column assembly 100 at which the steering wheel would be attached and therefore may be termed an upper shroud portion, the inner shroud portion 106 correspondingly being termed a lower shroud portion.

The shroud 102 surrounds a telescopic steering column shaft 108. The shaft 108 comprises an outer shaft portion 110 that at least partially surround an inner shaft portion 112, the outer shaft portion 110 and inner shaft portion 112 being connected through complimentary axially extending splines. In the present embodiment, the outer shaft portion 110 is positioned closest to the end of the steering column assembly 100 at which the steering wheel would be attached and therefore may be termed an upper shaft portion, the inner shaft portion 112 correspondingly being termed a lower shaft portion. As such, the outer shaft portion 110 is tapered at an end opposing its attachment to the inner shaft portion 112 so that it may be secured to a steering wheel (not shown). The inner shaft portion 112 may be connected to an optional electric power steering gearbox 114 which in turn connects to the road wheels of the vehicle.

Due to this arrangement, the both upper portions, the outer shroud portion 104 and the outer shaft portion 110, move axially whilst the lower portions, the inner shroud portion 106 and the inner shaft portion 112, do not. Thus, when telescopically adjusting the steering column assembly 100, the outer shroud portion 104 and the outer shaft portion 110 slide over the inner shroud portion 106 and the inner shaft portion 112, respectively. The outer shroud portion 104 is secured to a fixed part of the vehicle using a clamp mechanism 116. A slit 118 is provided in the outer shroud portion 104, the slit 118 being closed up as the clamp mechanism 116 is closed in order to cause the outer shroud portion 104 to tighten around and grip the inner shroud portion 106.

A lower column bearing assembly 120 is located between the inner shaft portion 112 and the gearbox 114. An upper column bearing assembly 122 is located between the outer shaft portion 110 and an inner surface of the outer shroud portion 104. This snugly fills the space and ensures that the shaft 108 is located securely within the shroud 102.

A support assembly 124 is provided between the outer shaft portion 110 and the inner shroud portion 106 in the region in which they overlap. This support assembly 124 provides support for the shaft 108 close to the joint between the inner shaft portion 112 and the outer shaft portion 104. In use, the support assembly 124 removes the free play that would otherwise exist and this increases the minimum natural frequency of the steering column assembly compared with the same assembly where the support assembly 124 is omitted. This can provide a welcome improvement in the levels of noise, vibration, and harshness (NVH) perceived by a user when the vehicle is travelling along a rough surface.

To allow the length of the shroud 102, and thus the steering column assembly 100, to be adjusted, the outer shroud portion 104 must be free to move axially relative to the inner shroud portion 106. As the outer shroud portion 104 is also fixed to the outer shaft portion 110 by way of the upper bearing assembly 122, the support assembly 124 is therefore fixed axially only to an outer surface of the outer shaft portion 104 and is therefore able to slide axially relative to an inner surface of the inner shroud portion 106. Although the present embodiment is formed in this manner, it would also be possible to axially fix the support assembly 124 to the inner shroud portion 106 and allow it to slide axially relative to the outer shaft portion 110.

Figure 2:
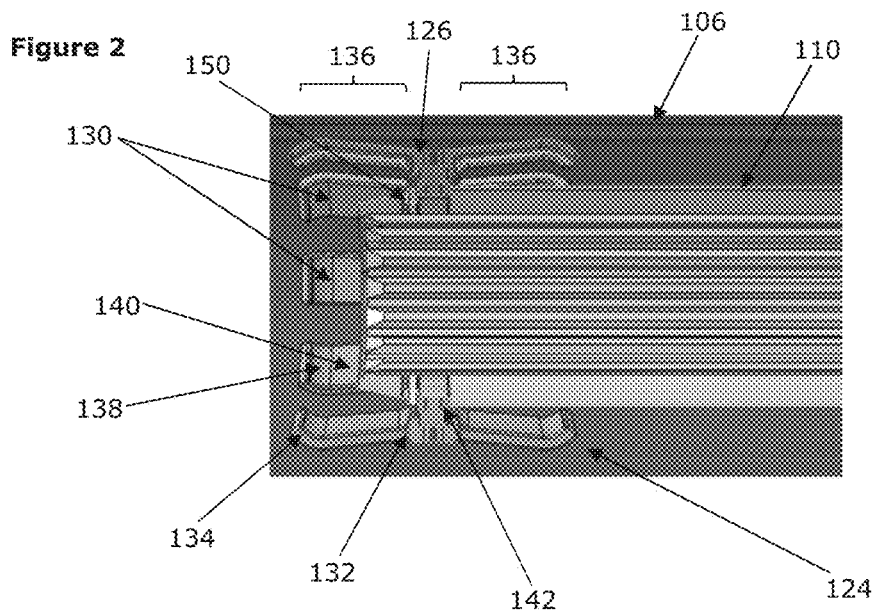
FIG. 2 is an enlarged view of the interaction between the upper shaft portion, lower shroud portion, and support assembly of the embodiment of FIG. 1.

The support assembly 124 of the present embodiment is shown in more detail in FIG. 2. The support assembly 124 comprises a body portion 126 which extends around the circumference of the outer shaft portion 110. Although the body portion 126 extends substantially continuously, there may be one or more breaks in the body portion 126 to facilitate manufacture or assembly. In the present embodiment a single break in the body portion 126 is present, which is not shown.

Adjoining the body portion 126 are a plurality of resiliently-deformable legs 130. Each resiliently-deformable leg 130 adjoins the body portion 126 at a proximal end 132, with the distal end 134 of each resiliently-deformable leg 130 extending away from the body portion 126 in a substantially axial direction of the shaft 108, in use. Two sets 136 of resiliently-deformable legs 130 are shown, extending in opposing axial directions. Each set 136 comprises nine resiliently-deformable legs 130, equally spaced around the body portion 126.

The total number of resiliently-deformable legs may vary, with a minimum of two resiliently-deformable legs and preferably at least three resiliently-deformable legs equally spaced around the body portion. However, a greater number of resiliently-deformable legs may be used with any form of spacing, if so desired. In the depicted embodiment, the resiliently-deformable legs 130 are formed integrally with the body portion 126.

Each resiliently-deformable leg 130 has a profile that extends out radially along at least a part of its length, such that it may impart a biasing force between the inner surface of the inner shroud portion 106 and the outer surface of the outer shaft portion 110 at least when the outer shaft portion 110, to which it is attached, becomes axially misaligned with the inner shroud portion 106. If the support assembly 124 is sized such that the resiliently-deformable legs 130 are always under some compressive force when in use, the profile of the resiliently-deformable legs 130 will ensure that the biasing force is greater with misalignment.

The distal end 134 of each resiliently-deformable leg 130 includes a curved portion 138 that has a slight curvature inwards towards a central axis of the support assembly 124. This curvature ensures that the resiliently-deformable legs 130 have a reduced chance of catching on the inner surface of the outer shroud portion 104, for instance, and will therefore increase the sliding efficiency.

By designing the slope angle of a main portion 140 of the resiliently-deformable legs 130 and the curvature of the curved portion 138 with a specific relationship, it can be ensured that, when flexing, the area of the resiliently-deformable leg 130 in contact with the inner shroud portion 106 is substantially constant. Therefore, the feel of the steering will not be affected by misalignment. The specific relationship required to achieve this feature will be known to the person skilled in the art and therefore will not be discussed in any further detail.

At least an outer surface of the resiliently-deformable legs 130, that is, the surface which contacts the inner surface of the inner shroud portion 106, may be formed of a material which has low coefficients of static and sliding friction with the material forming the inner surface of the inner shroud portion 106. Preferably, at least the coefficient of sliding friction will be close to zero. The resiliently-deformable legs 130 may, for example, be made of a polymer material whilst the inner shroud portion 106 is made of a metal. Alternatively, a low friction coating such as polytetrafluoroethylene (PTFE) may be provided on one or both sliding parts, or a lubricant such as grease or may be provided between the sliding parts.

The use of the resiliently-deformable legs 130 provides support and thus increases the minimum natural frequency of the steering column assembly 100. However, it is still necessary to allow the shaft 108 to rotate within the shroud 102. In the first embodiment, an inner portion 142 of the support assembly 124 is provided which has a low coefficient of sliding friction with the body portion 126. Therefore, the inner portion 142 is configured to remain stationary during rotation of the shaft 108 within the shroud 102 and to act as a plain bearing with the body portion 126.

Figure 3:
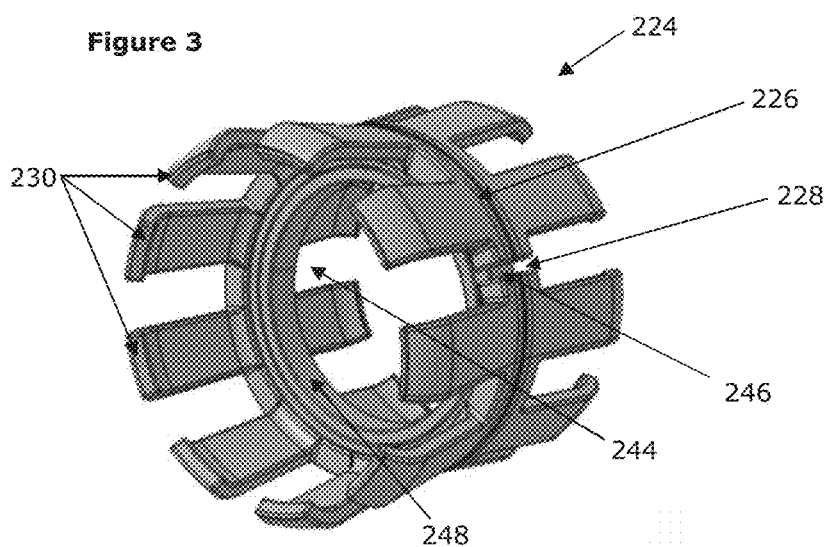
FIG. 3 is detail perspective view of the support assembly of a second embodiment of the invention.

In a second embodiment, shown in FIG. 3, a support bearing assembly 244 is provided within the support assembly 224, in place of the inner portion 142. In use, a first bearing race 246 of the support bearing assembly 244 is held stationary relative to the body portion 226 of the support assembly 224 and a second bearing race 248 is held stationary relative to the outer shaft portion 110. A plurality of bearing elements (not shown) held between the first bearing race 246 and second bearing race 248 allow the support bearing assembly 244 to rotate substantially freely.

The support bearing assembly 244 therefore allows the shaft 108 to rotate whilst the resiliently-deformable legs 230 of the support assembly 224 remain substantially rotationally stationary. Such an arrangement means that the support assembly 224 is able to move axially as well as rotate, both movements being in a low-friction manner.

As mentioned previously, and shown clearly in FIG. 3, there is a break 228 in the body portion. This break 228 allows the effective radius of the body portion 226 to be forcibly increased during assembly or manufacture. Therefore, the support bearing assembly 244 may be inserted such that it is seated within a recess in the body portion 226 and is held securely. This is only an example method of manufacture and other options are available within the scope of the present invention. For example, it may be possible to form the body portion 226 and resiliently-deformable legs 230 around the assembled support bearing assembly 244 by injection moulding or another such method.

The break 228 may further allow the support assembly 224 to adjust more readily, in use, for instance by allowing further variation in the shape or dimensions of the support assembly 224

Figure 4:
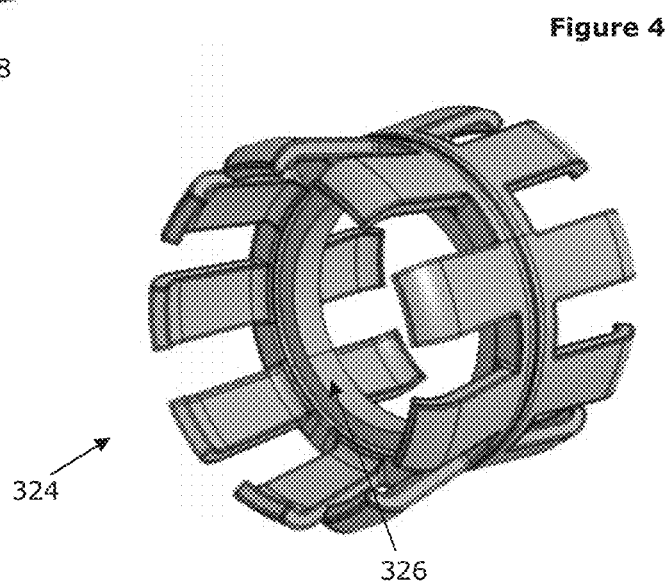
FIG. 4 is a detail perspective view of a support assembly of a third embodiment of the invention.

In a third embodiment of the support assembly 324, as shown in FIG. 4, the support bearing assembly 244 is omitted and instead the body portion 326 of the support assembly 324 itself forms a plain bearing with the shaft 108, in use. As with the resiliently-deformable legs 130, a number of methods of lowering friction between the body portion 326 and the shaft 108 may be used, such as material choice to limit the coefficient of sliding friction or the use of low friction coatings or lubricants.

It may be necessary to secure the support assembly 124 on the shaft 108. This securing may be accomplished by an interference fit, for example, or a securing means may be used. In the present embodiment, as shown in FIG. 2, a securing means in the form of a circlip 150 is used which attaches to the shaft 108 to secure the support assembly 124 in place. Other forms of securing means will be known and can be used without departing from the scope of the invention.

Although each of the three described embodiments have the body portion and inner portion towards the inside of the support assembly and the resiliently-deformable legs towards the outside of the bearing assembly, it may also be possible to form the support assembly in reverse with the resiliently-deformable legs towards the inside. In this case, the resiliently-deformable legs of the support assembly will bear on and be held rotationally stationary relative to the outer shaft portion, with a plain bearing, inner portion, or support bearing assembly, for example, then acting with the inner shroud portion to allow low friction rotation.

The invention claimed is:

1. A telescopic steering column assembly comprising a shroud having an inner shroud portion and an outer shroud portion, an end part of the inner shroud portion being received within an end part of the outer shroud portion to permit telescopic adjustment of the steering column assembly,
a telescopic steering shaft that passes through the shroud, the telescopic steering shaft comprising an inner shaft portion and an outer shaft portion, an end part of the inner shaft portion being received within an end part of the outer shaft portion,
the telescopic steering shaft being supported by the shroud through a support assembly interposed between the outer shaft portion and the inner shroud portion, the support assembly, in use, limiting or removing free play between the telescopic steering shaft and the shroud that would otherwise occur in at least one direction orthogonal to the telescopic movement,
wherein the support assembly includes a body portion that is restrained in a longitudinal direction of the telescopic steering shaft relative to one of the outer shaft portion and inner shroud portion and a plurality of resiliently-deformable legs extending away from the body portion to engage the other of the outer shaft portion and the inner shroud portion, the resiliently-deformable legs, in use, applying a biasing force between the outer shaft portion and inner shroud portion, the resiliently-deformable legs including a curved portion, the curved portion being shaped such that a constant surface area of the curved portion is in contact with the other of the outer shaft portion and inner shroud portion.

2. A telescopic steering column assembly according to claim 1, wherein the resiliently-deformable legs bear on a surface of the other of the outer shaft portion and inner shroud portion.

3. A telescopic steering column assembly according to claim 1, wherein the resiliently-deformable legs each have a proximal end adjoining the body portion and a distal end which extends away from the body portion in a substantially longitudinal direction of the telescopic steering shaft.

4. A telescopic steering column assembly according to claim 3, wherein the resiliently-deformable legs form two sets, a first set of the resiliently-deformable legs extending away from the body portion in substantially the longitudinal direction of the telescopic steering shaft and a second set of the resiliently-deformable legs extending in a direction substantially opposing that of the first set.

5. A telescopic steering column assembly according to claim 4, wherein there are an equal number of resiliently-deformable legs in each set.

6. A telescopic steering column assembly according to claim 5, wherein there are at least four resiliently-deformable legs in each set.

7. A telescopic steering column assembly according to claim 6, wherein there are at least six resiliently-deformable legs in each set.

8. A telescopic steering column assembly according to claim 7, wherein there are at least nine resiliently-deformable legs in each set.

9. A telescopic steering column assembly according to claim 1, wherein each resiliently-deformable leg is a leaf spring.

10. A telescopic steering column assembly according to claim 1, wherein the resiliently-deformable legs are spaced evenly around the support assembly.

11. A telescopic steering column assembly according to claim 1, wherein the support assembly is held axially stationary on the one of the outer shaft portion and inner shroud portion by a fastening means.

12. A telescopic steering column assembly according to claim 11, wherein the fastening means is a circlip.

13. A telescopic steering column assembly according to claim 1, wherein the body portion forms a plain bearing, in use, with the one of the outer shaft portion and inner shroud portion.

14. A telescopic steering column assembly according to claim 1, wherein the support assembly further comprises an inner portion, the inner portion being interposed between the body portion and the one of the outer shaft portion and inner shroud portion and forming a plain bearing with the body portion to enable low-friction rotation of the telescopic steering shaft relative to the shroud.

15. A telescopic steering column assembly according to claim 1, wherein the support assembly further comprises a support bearing assembly, the support bearing assembly being interposed between the body portion and the one of the outer shaft portion and the inner shroud portion to enable low-friction rotation of the telescopic steering shaft relative to the shroud.

16. A telescopic steering column assembly according to claim 1, wherein the one of the outer shaft portion and inner shroud portion is the outer shaft portion and the other of the outer shaft portion and inner shroud portion is the inner shroud portion.

17. A telescopic steering column assembly according to claim 1, wherein, in use, each resiliently-deformable leg is under load.

18. A telescopic steering column assembly according to claim 1, wherein the resiliently-deformable legs are integrally formed with the body portion.

19. A telescopic steering column assembly according to claim 1, wherein the support assembly forms an annulus around the telescopic steering shaft.

* * * * *